3,644,328
SYMMETRICAL AROMATIC DIAMINES CONTAINING A CENTRAL AZO LINKAGE
Hartwig C. Bach and Helmuth E. Hinderer, Durham, N.C., assignors to Monsanto Company, St. Louis, Mo.
No Drawing. Filed Nov. 26, 1968, Ser. No. 779,243
Int. Cl. C07c *107/06;* C09b *27/00, 43/06*
U.S. Cl. 260—169                                    4 Claims

ABSTRACT OF THE DISCLOSURE

Symmetrical aromatic diamines are provided having the formula $$NH_2-Ar-(X)_n-Ar-N=N-Ar-(X)_n-Ar-NH_2$$

wherein $n$ is 0 or 1, X is a divalent radical selected from the group consisting of

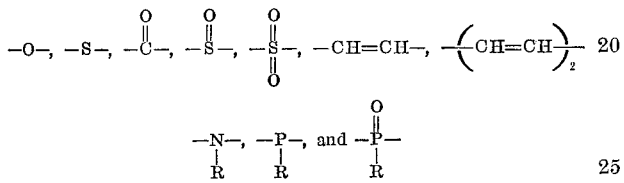

wherein R is a lower alkyl radical and Ar is a divalent aromatic single ring, fused ring, or multi-nuclear ring system, wherein the rings of said multi-nuclear ring system are connected only through aromatic carbon to aromatic carbon valence bonds or X radicals, with the proviso that where Ar is phenylene, $n$ is 1. The symmetrical azo aromatic diamine products are useful for the preparation of fiber and film forming polyimides having outstanding thermal resistance and mechanical properties.

BACKGROUND OF THE INVENTION

Oxidative coupling of organic molecules has been found to be a useful tool in the preparation of a variety of organic polymers. For example, oxidative coupling has been reported for the polymerization of substituted phenols to make poly(phenylene oxides). Other applications of oxidative coupling include the formation of carbon-to-carbon bonds between terminal acetylene groups to provide macrocyclic rings or polymers, the polymerization of benzene to poly(phenylene) and the synthesis of polyindigo.

SUMMARY OF THE INVENTION

The instant invention relates to the discovery that symmetrical conjugated aromatic diamines and symmetrical aromatic diamines which are capable of electronic interaction similar to that of the corresponding conjugated diamines, hereafter referred to as pseudo-conjugated diamines, can be oxidatively coupled or dimerized to provide novel symmetrical conjugated or pseudo-conjugated diamines useful in the preparation of polyimides having excellent thermal resistance. This discovery is surprising because attempts to oxidatively dimerize similar diamines which do not exhibit the electronic interaction characterics of conjugated compounds have failed to provide diamines of high purity found by the use of the process of this invention.

Accordingly, an object of this invention is to provide a novel process for the preparation of symmetrical conjugated and pseudo-conjugated aromatic diamines containing a central azo linkage.

Another object of the invention is to provide a process for the oxidative dimerization of symmetrical multi-nuclear primary aromatic diamines in which the nuclei are connected by linkages which permit electronic interaction between the rings.

A further object of the invention lies in the provision of a novel class of conjugated and pseudo-conjugated diamines useful in the synthesis of thermally stable polymeric films or fibers.

Other objects of the instant invention will become apparent to those skilled in the art from the ensuing detailed description.

DETAILED DESCRIPTION OF THE INVENTION

As above-indicated the process of the instant invention involves the catalytic dimerization of a particular class of symmetrical aromatic primary diamines. The process in its simplest form may be represented by the following equation:

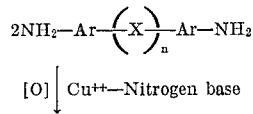

[O] | Cu++—Nitrogen base

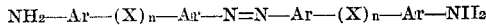

wherein $n$ is 0 or 1 and Ar represents a divalent aromatic radical which may be a single ring, fused ring or multi-nuclear ring system where such multi-nuclear ring systems are connected only through aromatic carbon to aromatic carbon bonds or X radicals wherein X represents a divalent radical selected from the group consisting of

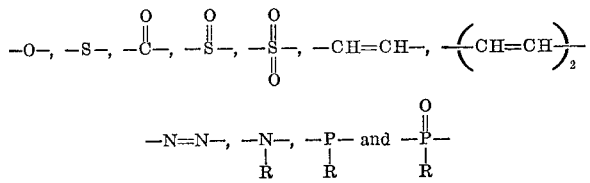

R being a lower alkyl radical, with the proviso that where Ar is phenylene, $n$ is 1.

In order to dimerize diamines according to the process of the instant invention the reactant compositions must conform to certain critical limitations. The reactant must be symmetrical or, otherwise stated, it must have a plane of symmetry or a point where one side of the molecule is the mirror image of the other. The starting diamine must be aromatic and either be fully conjugated or reflect the influence of conjugation, the latter being referred to for purposes of this description as pseudo-conjugation. It has been found that not only certain diamines which are conjugated in the classic sense of the term, such as

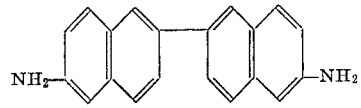

readily dimerize according to the instant invention, but also it has been surprisingly discovered that aromatic ring systems may be connected through certain divalent connecting groups above-identified by X without disruption of the influence of conjugation. Thus, certain diamines employed in the process described herein exhibit the influence of conjugation without being truly conjugated in the classic sense. For example, neither of the diamines,

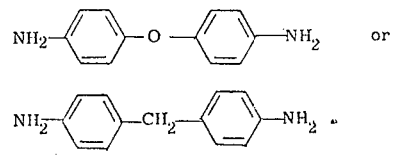

is fully conjugated in the classic sense, yet the diaminodiphenyl ether exhibits electronic interaction characteristic of conjugated compounds and will dimerize according to the process of this invention, whereas, the diamine containing the connecting methylene radical does not exhibit the electronic interaction characteristic of conjugation and does not readily react in the instant process to provide dimers. If the basicity of an amine group of an aromatic diamine is altered by neutralization of the other amine group of the symmetrical diamine with HCl, for example, the diamine may be classified as conjugated or pseudo-conjugated for purposes of this invention.

The term Ar as above-defined is intended to include divalent aromatic single ring, fused ring and multi-nuclear ring systems which may be carbocyclic or heterocyclic. The aromatic ring systems are those having benzenoid unsaturation and exhibiting resonance in the classic sense, including radicals derived from benzene, naphthalene or pseudo-conjugated bridged diphenyls such as diphenyl sulfone and diphenyl ether. The heterocyclic radicals may contain one or more heteroatoms such as —O—, —S—, and —N=, representative of which are those derived from pyridine, oxadiazole, thiazole, imidazole, pyrimidine and the like. As already indicated where diamines containing a multi-ring system are employed the rings must be connected through aromatic carbon to aromatic carbon valence bonds or through groups such as,

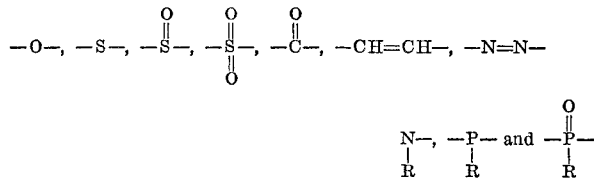

which result in pseudo-conjugation as above-defined.

Typical examples of the various types of diamines of general Formula I useful in the preparation of diamine monomers of the general structure II by the process of this invention are the following:

I

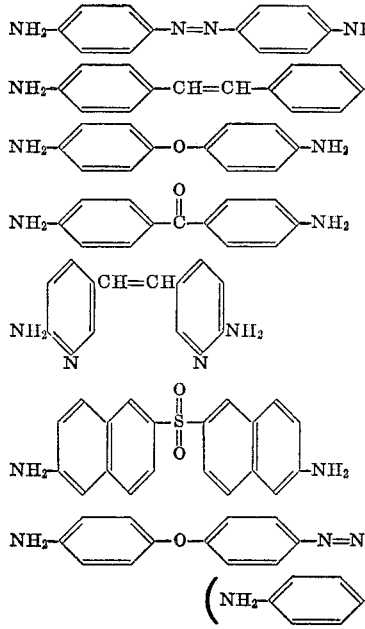

II

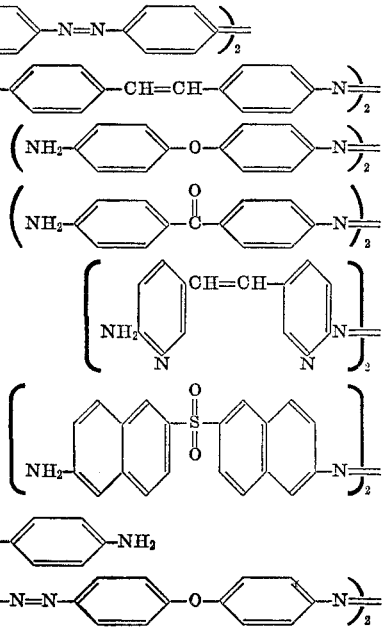

The symmetrical diamines generally employed as reactants in the process of this invention are prepared by means known to those skilled in the art.

The oxidative dimerization process of this invention generally involves the oxidative coupling of symmetrical aromatic diamines in solution, utilizing a cupric ion complexed with a nitrogen base. Preferably, the oxidative solution dimerization is conducted as a catalytic process with a cupric-cuprous redox couple complexed with a nitrogen base as the catalyst, a nitrogen base as the solvent and molecular oxygen as the primary oxidant.

The active catalyst system is preferably obtained by oxidation of a cuprous salt in the presence of a nitrogen base, although some cupric salts such as cupric acetate may also be used. Any cuprous salt may be used in the practice of this invention provided that it forms a complex with the nitrogen base that is soluble in the reaction medium and that it is capable of existing in the cupric state. The particular salt used has no effect on the type of product obtained. Typical examples of cuprous salts suitable for the process are cuprous chloride; cuprous bromide, cuprous sulfate, cuprous acetate, cuprous benzoate and the like. The use of cupric salts is generally less desirable in the catalyst preparation although cupric acetate is quite effective.

It is believed that cupric ion complexed with a nitrogen base, complexes with the amino groups of the starting diamine, then oxidizes them and aids in the coupling of the resulting species. During this reaction cuprous salt or complex is formed which is reoxidized by oxygen (or its precursors such as $H_2O_2$) to the cupric state. Based on this mechanism, chemical oxidants also appear to be useful which can oxidize cuprous to cupric.

Since the reaction does not destroy the catalyst, only a small catalytic amount of cuprous or cupric salt needs to be used, from about 0.1 to 10 mole percent, based on the moles of aromatic diamine to be oxidized, although larger amounts can be used, as desired.

Nitrogen bases which may be used as a component of the catalyst as well as the reaction medium include all nitrogen bases except those which are oxidized by the catalyst. It is preferred to have the basicity of the nitrogen base as close as possible to that of the primary diamine starting material in order to help the reaction proceed at the most optimum rate and give better yields.

Suitable nitrogen bases include various amides such as phosphoramides, carbonamides and sulfonamides. Examples of such amides are hexamethylphosphoramide, dimethylacetimide, dimethyl formamide, dimethylpropionamide, diethylacetamide, N-acetylpyrrolidone, N-ethyl pyrrolidone and the like. Of these amide bases, dimethylacetamide and hexamethylphosphoramide are generally preferred.

Other nitrogen bases, suitable for carrying out the process of this invention, include aliphatic tertiary amines such as triethylamine, tributylamine, diethylmethylamine, and cyclic amines such as pyridine, n-alkyl piperidines, quinolines, isoquinolines, N-alkyl morpholines and the like. Among these, pyridine is preferred.

Mixtures of bases which form a part of the catalyst system may also be used. They may also be used in combination with compounds which act only as the reaction medium. For example, nitrobenzene is a good reaction medium, and may be used in combination with one of the aforementioned bases. Other inert solvents which do not interfere with the catalyst or are not oxidized to any appreciable extent by it may also be used as the reaction medium. It was found, in the course of this work, that reaction media in which the products of the reaction are relatively insoluble lead to a cleaner, simpler separation of product from catalyst and by-products, thus increasing the yield of symmetrical diamine obtained.

In a preferred mode of operation of the process of the invention, molecular oxygen is used as the primary oxidant and may be introduced into the reaction medium by diffusion or injection. Either 100 percent oxygen or gas mixtures containing oxygen may be used. In addition, other compounds capable of supplying oxygen, such as hydrogen peroxide may be used.

In the practice of this invention, the order of addition of the various reactants is not critical. In one preferred mode of carrying out this invention, the catalyst may be prepared by oxidizing cuprous chloride in a base such as pyridine. The symmetrical primary aromatic diamine is then added and oxidatively coupled by the addition of oxygen until about the theoretical volume has been consumed.

Alternatively, the catalyst may be prepared in the same manner as described above and then added to a chilled solution of the primary aromatic diamine in the appropriate reaction medium, prior to the addition of oxygen. In either case, the amount of oxygen consumed can be measured with great accuracy, by using a closed system and a base buret.

The preparation of the catalyst and the oxidative coupling reaction may be carried out in the temperature range of from about —30° C. to about 120° C., preferably from about —20° to about 70° C. It has been found that the catalyst preparation may be carried out conveniently and preferably at room temperature. The rate of reaction is satisfactory at these temperatures and a very efficient catalyst is produced.

The unique and surprising feature of the oxidative coupling reaction of the present invention is that of the dimer product obtained is essentially the only product resulting from the process. The selective oxidation of one amino group of the symmetrical diamine, to the exclusion of the other amino group, which is equally reactive, is indeed unexpected.

Although the exact reason for this selectivity is unknown, it is believed that the amino groups of the conjugated diamine product are less basic than those of the starting material, due to the increased degree of conjugation. Thus, the catalyst reacts preferentially with the more basic amino groups of the starting material, as long as they are present in the mixture. This theory is further strengthened by the fact that greater care must be taken in controlling the reaction condition, as the difference in basicity of the starting material and product becomes smaller, in order to obtain high yields of pure dimer.

Determination of the basicities of the amino groups of the starting diamine and the product can be helpful in predicting suitable conditions for carrying out the reaction. In general, as the difference in basicity between the amino groups of the starting material and product increases, the range of reaction conditions which can be used satisfactorily in the practice of this invention is broadened; conversely, as the difference in basicity becomes smaller, the range of conditions is narrowed.

The optimum reaction conditions to be used for carrying out the process of this invention will be dependent in large part on the structure and molecular weight of the starting material and final product. These conditions may be easily optimized by those skilled in the art.

EXAMPLE I

Preparation of

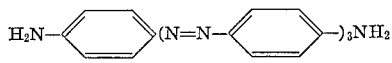

Cuprous chloride (10 g.) was oxidized with molecular oxygen in a mixture of 720 ml. of dimethylacetamide (DMAc) and 180 ml. of pyridine. 4,4'-azodianiline (20 g.) was added to this catalyst solution and the resulting reaction mixture was stirred under an atmosphere of $O_2$; 1185 ml. of $O_2$ were absorbed in 4 hrs. 40 min. at 24° C. The reaction product was isolated by coagulation of the reaction mixture in 1 l. of ammonium hydroxide. After dilution with 4.4 l. of $H_2O$ the product was filtered off, dried and extracted into 190 ml. of dimethylformamide. By coagulation in $H_2O$ 16.1 g. (80.1% yield) of the title compound were obtained, M.P.=290–291° C. (recryst. from pyridine).

EXAMPLE II

Preparation of

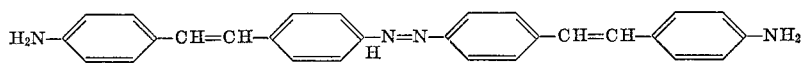

Cuprous chloride (0.5 g.) was oxidized with molecular oxygen in a mixture of 40 ml. of DMAc and 10 ml. of pyridine. At 0° C., 4.2 g. (0.02 mole) of 4,4'-diaminostilbene were added to the catalyst solution. In 3 hrs. 20 min. at 0° C. the reaction mixture absorbed 230 ml. of $O_2$ (theory: 224 ml.). The product was isolated by coagulation in aqueous ammonia. Yield: 3.9 g. (93%), M.P.=240° C. (dec.).

EXAMPLE III

Preparation of

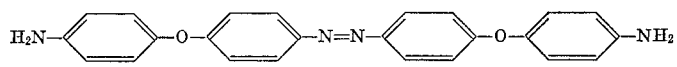

4,4'-(p-aminophenoxy)azobenzene

The catalyst was prepared by oxidizing 0.5 g. of cuprous chloride in 50 ml. of pyridine with 32 ml. of molecular oxygen. The chilled catalyst solution was added to a chilled mixture of 20.0 g. (0.10 mole) of 4,4'-diaminodiphenyl ether, 200 ml. of pyridine and 50 ml. benzene. The reaction was conducted at 1–2° until 1120 ml. of oxygen has been consumed (the calculated volume for dimerization) during 157 min. The crude title diamine was isolated from the filtered mixture by partial concentration and coagulation with water. Purification was effected by fractional crystallization from a pyridine/water mixture. The yield of desired product (green-brown powder) melting at 218° C. was 10.04 g. (50.7% yield).

*Analysis.*—Calcd. for C$_{24}$H$_{20}$N$_4$O$_2$ (percent): C, 72.71; H, 5.09; N, 14.13. Found (percent): C, 73.28; H, 5.82; N, 13.66.

EXAMPLE IV

Preparation of

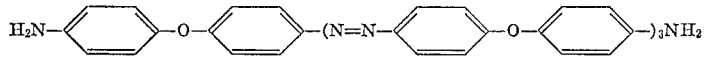

The catalyst was prepared by oxidizing with oxygen 0.2 g. of cuprous chloride in 40 ml. of pyridine. 4,4'-bis-(4-aminophenoxy)azobenzene (3.96 g., 0.010 mole) was added and oxidatively coupled at 24–25° C. until 124 ml. of oxygen had been consumed during 42 min. (calcd. volume for dimerization is 122 ml.). The collected solid (filtration) was leached with 50 ml. of boiling pyridine (discarded) then twice with boiling DMAc (100 ml. and 50 ml.). The combined DMAc extracts were cooled and the solid was washed with water and dried in vacuo. The yellow-green powder weighed 1.85 g. (46.9% yield) and melted with decomposition at 305°.

*Analysis.*—Calcd. for C$_{48}$H$_{36}$N$_8$O$_4$ (percent): C, 73.08; H, 4.60; N, 14.21. Found (percent): C, 71.96; H, 4.45; N, 14.30.

Through the above described process a novel class of symmetrical conjugated and pseudo-conjugated aromatic azo diamines have been prepared which compounds may be represented by the formula, NH$_2$—Ar(X)$_n$Ar—N=N—Ar(X)$_n$Ar—NH$_2$ where *n* is 0 or 1, Ar represents a divalent aromatic radical which may be a single ring, fused ring or multi-ring systems where such multi-ring systems are connected only through aromatic carbon to aromatic carbon valence bonds or through X radicals where X represents a divalent radical selected from the group consisting of

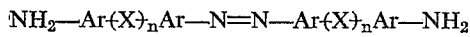

and

where R is a lower alkyl radical and with the proviso that where Ar is phenylene, *n* is 1. The diamines prepared according to the instant invention have been found to be particularly suitable for the formation of fiber and film forming polyamides or polyimides by condensation with aromatic acid chlorides or dianhydrides from which fibers and films having excellent thermal stability and mechanical properties can be prepared.

We claim:

1. A symmetrical aromatic diamine represented by the formula

NH$_2$—Ar—X—Ar—N=N—Ar—X—Ar—NH$_2$ wherein Ar is a phenylene radical and X is a divalent radical selected from the group consisting of

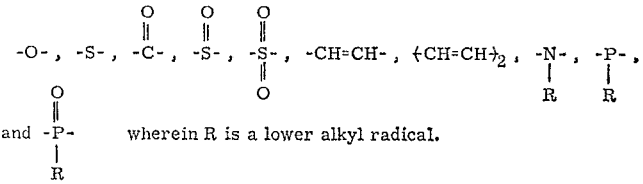

wherein R is a lower alkyl radical.

2. A diamine having the formula

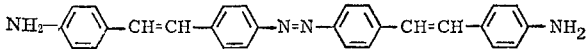

3. A diamine having the formula

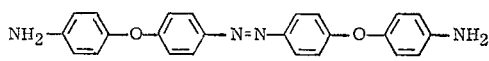

4. A diamine having the formula

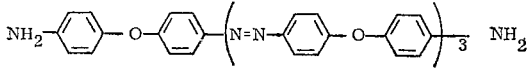

References Cited

UNITED STATES PATENTS 3,346,491  10/1967  Giammaria et al. __ 260—174 X
3,403,200  9/1968   Randall _____ 260—178 X

OTHER REFERENCES

Badger et al., Chemical Abstracts, vol. 62, 14665 (1965).
Terent'ev, Chemical Abstracts, vol. 50, 4807 (1956).
Terent'ev, Chemical Abstracts, vol. 53, 1327 (1959).
Theilheimer, "Synthetic Methods of Organic Chemistry," vol. 12, p. 165 (1958).

FLOYD D. HIGEL, Primary Examiner

U.S. Cl. X.R.

252—429 A, 431 R, 431 N; 260—78 R, 154, 156, 157, 158, 174, 194, 205, 206, 578, 687